Oct. 4, 1932.  N. HALL  1,881,077
ELECTROMAGNET
Filed Oct. 16, 1931
Fig. 1.  Fig. 2.  Fig. 3.
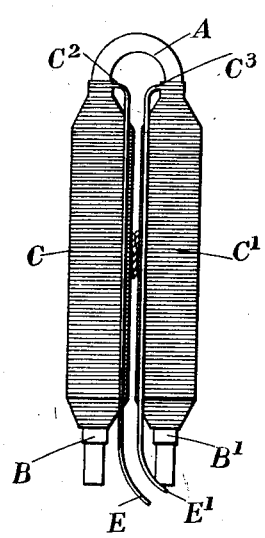
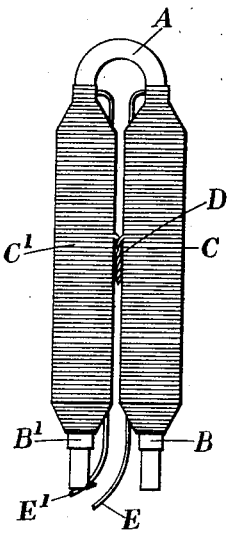
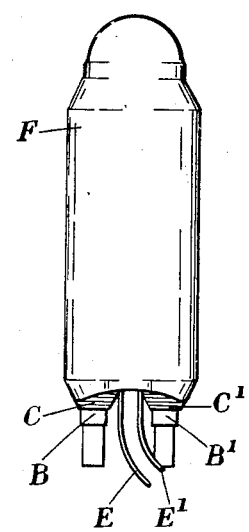
Fig. 4.  Fig. 5.
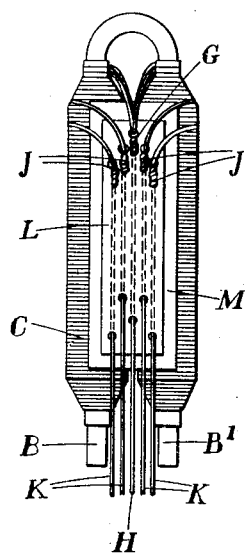
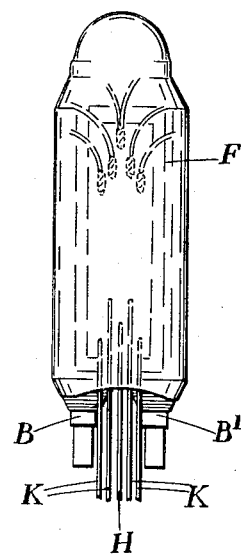
INVENTOR
NORMAN HALL.
BY
ATTORNEY Patented Oct. 4, 1932

1,881,077

UNITED STATES PATENT OFFICE

NORMAN HALL, OF LYNDHURST GROVE, LOW FELL, ENGLAND

ELECTROMAGNET

Application filed October 16, 1931, Serial No. 569,313, and in Great Britain October 17, 1930.

This invention relates to electromagnets of the kind known as "hair pin" or "horse shoe" magnets, and more particularly the small electromagnets used on electrically operated organs.

Heretofore, in order to protect the windings and in particular the outer layer of wire on each, the soldered joints between the coils, and the anchorage of the lead wires, a covering of paper or cloth or wound thread has been provided around each coil or alternatively encircling both coils. These coverings have their disadvantages in that complete protection to the windings, joints and lead anchorages cannot be given where this is necessary, and consequently the handling and usage of the magnet is attended with the risk of damaging the windings, joints and leads. Further, their application to the magnet takes considerable time to produce a neat, effective covering.

The object of the present invention is to provide a covering which will envelope, with the exception of the pole ends, both the magnet windings or the whole magnet if desired, and present a smooth surface with no projecting portions, while at the same time fitting snugly over the magnet so as to grip everything with a substantial pressure which not only securely holds and covers the lead wire anchorages and prevents movement of the leads at the points where they are most likely to be broken off, but causes the coils to be firmly held on their cores or tines.

This object is attained according to the invention by providing a sheath which is preferably closed at one end, of material which may be made to expand or contract at will, so that by placing over the magnet such a sheath while in its expanded condition and then subsequently causing it to contract, the sheath will conform closely to the shape of the magnet, holding the parts tightly together.

One form of such a sheath is made of cellulose hydrate and is similar to those used for capping corks and stoppers. The sheath is maintained in its expanded state by being stored in water as is well known. It is applied wet to the magnet, that is to say, it is taken from the water in which it is kept and the superfluous moisture drained or wiped away, in which state it is easily slipped over the bent end of the magnet, the windings of which have preferably been covered or impregnated with insulating material. As the sheath dries it shrinks, and owing to its plastic nature conforms to the general shape of the magnet. The winding, the soldered joints and the anchorage of the lead wires are thus effectively covered and the parts are held tightly together so that relative movement between the coils and the core is restricted.

The flexible leads are preferably brought out at the open end of the sheath so as to further minimize the risk of their being broken off.

The whole or part of the sheath may be filled with high melting point wax or other insulating compound.

The external and internal surfaces of the sheath may be treated with varnish, wax or other suitable material to prevent the reabsorption of moisture.

If desired instead of forming the sheaths to cover the entire winding, they may be made shorter so as to cover only the soldered connection between the coils or the anchorage of the lead wires.

Another form of sheath may be of gelatinous material. In this case the sheaths would be stored dry, and when required for use would be expanded by soaking in cold water for a short time, allowed to drain and applied in the swollen state. As the moisture dries out the sheaths contract to their original size.

The invention is illustrated by way of example in the accompanying drawing in which:

Fig. 1 is an elevation of one side of an uncovered magnet having two windings joined in series.

Fig. 2 is an elevation of the other side of the magnet shown in Fig. 1.

Fig. 3 shows the magnet of Figs. 1 and 2 with a sheath applied.

Fig. 4 is an elevation of an uncovered magnet having four windings.

Fig. 5 shows the magnet of Fig. 4 with a sheath applied.

Referring to Figs. 1 to 3, A is the core of the magnet B, B¹, paper tubes which are passed over the tines of the core A and which constitute the winding formers, and C, C¹ are the windings which are joined by a soldered joint at D, and have their leads E, E¹ usually of stranded wire coming away at C², C³, while F is the shrinkable sheath which is passed over the magnet when in a wet condition. The sheath F when dry contracts and tightly grips the windings, joint, lead anchorages and leads, so that it ultimately presents an outline as shown in Fig. 3. The resulting tight grip causes the windings C, C¹ to press sideways against the tubes B, B¹ which in their turn are pressed against the tines of the core A sufficiently to prevent relative movement of the parts, so that the use of adhesive may be dispensed with. It will be seen that the leads E, E¹ are left loose between the windings C, C¹ and in view of the distance between the open end of the sheath L and the lead anchorages C², C³, any movement of the leads is imperceptible at their anchorages gripped tightly by the sheath. Hence the risk of fracture is reduced to a minimum.

Referring to Figs. 4 and 5 which show a four winding magnet, the one set of ends are joined by a soldered joint G to a common lead H, while the other set of ends are joined by soldered joints J to separate leads K. The said soldered joints are made to project through perforations at the upper end of an insulating panel L which may be a thin sheet of varnished cotton, silk, or the material sold commercially under the registered trade mark "bakelite", the leads passing behind the panel and emerging through perforations at the lower end. A similar insulating panel M of larger area is interposed between the sheet L and the windings. The several parts are temporarily held in position by means of a few turns of insulating material such as varnished silk. A shrinkable sheath is then applied giving a finished appearance as shown in Fig. 5, with all the parts held firmly in position. Ordinarily, it is difficult to protect the windings, joints and leads of this kind of magnet and at the same time hold the increased number of parts firmly in position, without having to take a number of steps which add to the cost of production. According to the present invention, by the single operation of applying a shrinkable sheath to the magnet the insulating, protecting and binding are effected simultaneously.

I claim:

1. A "horse shoe" electro-magnet and a single outer covering on said magnet adapted to cover the magnet coils on each tine of the "horse shoe", the said covering comprising a sheath of material which may be made to expand or contract at will, so that by placing over the magnet such a sheath while in its expanded condition and then subsequently causing it to contract, the sheath will conform closely to the shape of the magnet, holding the parts tightly together.

2. An electro-magnet according to claim 1 wherein the sheath is closed at one end.

3. An electro-magnet according to claim 1 wherein the sheath is made of cellulose hydrate and applied to the magnet in a wet condition.

4. An electro-magnet according to claim 1 wherein the sheath is closed at one end and is made of cellulose hydrate and applied to the magnet in a wet condition.

5. A "horse shoe" magnet according to claim 1 wherein leads are secured to the ends of the magnet coils at the neutral end of the magnet and brought out at the end of the sheath adjacent the ends of the tines.

6. A "horse shoe" electro-magnet, leads secured to the ends of the magnet windings adjacent the neutral portion of the magnet, said leads being carried along the tines, and a sheath of cellulose hydrate closed at one end covering said magnet and leads.

7. An electro-magnet according to claim 6, and an insulating panel, and perforations at one end of said panel through which the joints between the coils and leads are made to project.

NORMAN HALL.